United States Patent
Chen et al.

(10) Patent No.: US 8,447,917 B2
(45) Date of Patent: May 21, 2013

(54) FLASH MEMORY DEVICES AND METHODS FOR CONTROLLING A FLASH MEMORY DEVICE

(75) Inventors: Yeow-Chyi Chen, Taipei (TW);
Hong-Ching Chen, Kao-Hsiung Hsien (TW); Li-Chun Tu, Hsinchu (TW);
Tzu-Chieh Lin, Hsinchu (TW);
Chi-Wei Peng, Hsinchu County (TW)

(73) Assignee: Mediatek Inc., Hsin-Chu (TW)

( * ) Notice: Subject to any disclaimer, the term of this patent is extended or adjusted under 35 U.S.C. 154(b) by 442 days.

(21) Appl. No.: 12/721,724

(22) Filed: Mar. 11, 2010

(65) Prior Publication Data

US 2010/0332734 A1    Dec. 30, 2010

Related U.S. Application Data

(60) Provisional application No. 61/220,284, filed on Jun. 25, 2009.

(51) Int. Cl.
*G06F 12/00* (2006.01)
*G06F 12/02* (2006.01)

(52) U.S. Cl.
USPC ............... 711/103; 711/105; 711/E12.001; 711/E12.008

(58) Field of Classification Search
USPC ............... 711/103, 105, E12.001, E12.008
See application file for complete search history.

(56) References Cited

U.S. PATENT DOCUMENTS

| | | | | |
|---|---|---|---|---|
| 6,131,139 | A | * | 10/2000 | Kikuchi et al. ............... 711/103 |
| 7,409,473 | B2 | | 8/2008 | Conley et al. |
| 7,606,992 | B1 | * | 10/2009 | Karabatsos ................... 711/170 |
| 2008/0195806 | A1 | * | 8/2008 | Cope ............................. 711/111 |
| 2010/0100666 | A1 | * | 4/2010 | Min ............................... 711/103 |

FOREIGN PATENT DOCUMENTS

| | | |
|---|---|---|
| CN | 1790308 | 6/2006 |
| CN | 101120414 | 2/2008 |

OTHER PUBLICATIONS

English language translation of abstract of CN 1790308 (published Jun. 21, 2006).

* cited by examiner

*Primary Examiner* — Hoai V Ho
*Assistant Examiner* — Tri Hoang
(74) *Attorney, Agent, or Firm* — McClure, Qualey & Rodack, LLP

(57) ABSTRACT

A flash memory device includes a memory array and a memory control circuit. The memory array includes memory modules. Each memory module is located in a memory channel and includes a predetermined number of memory cells. The memory control circuit is coupled to the memory array via an address latch enable (ALE) pin and a command latch enable (CLE) pin. The ALE pin and the CLE pin are coupled to all of the memory cells and shared by all of the memory cells in the memory array.

22 Claims, 10 Drawing Sheets

FLASH MEMORY DEVICES AND METHODS FOR CONTROLLING A FLASH MEMORY DEVICE

CROSS REFERENCE TO RELATED APPLICATIONS

This application claims the benefit of U.S. Provisional Application No. 61/220,284 filed Jun. 25, 2009, and entitled "Apparatus and Method of IO Control for Flash Memory System". The entire contents of which are hereby incorporated by reference.

BACKGROUND OF THE INVENTION

1. Field of the Invention

The invention relates to a flash memory device, and more particularly, to a flash memory device with a reduced amount of pins and reduced power consumption for reading/writing operations.

2. Description of the Related Art

Flash memory is widely used in electronic products today, especially for portable applications, as a result of its non-volatile and in-system re-programmable characteristics. The basic structure of a flash memory cell includes a control gate, a drain diffusion region and a source diffusion region on a substrate to form a transistor with a floating gate under the control gate for an electron storage device. The channel region lies under the floating gate with a tunnel oxide insulation layer therebetween. The energy barrier of the tunnel oxide can be overcome by applying a sufficiently high enough electric field across the tunnel oxide insulation layer. This allows electrons to pass through the tunnel oxide insulation layer, thus, changing the amount of electrons stored in the floating gate. The amount of electrons stored in the floating gate determines the threshold voltage (Vt) of the cell. More electrons stored in the floating gate causes the cell to have a higher Vt. The Vt of a cell is used to represent stored data of the cell.

With the development of flash memory technology, a flash memory device is now capable of supporting multiple channels of memory modules. Each channel comprises a memory module and is coupled to a set of input/output (I/O) pins (as an example, 8 bits of I/O pins). As the number of channel's increase, the number of I/O pins and control pins, such as the write enable (WE) pins, read enable (RE) pins, write protect (WP) pins, ready/busy (RB) pins . . . etc., are all greatly increased.

Therefore, a novel design for a flash memory device, which may greatly reduce the total number of pins and further reduce power consumption of reading/writing operations, is highly required.

BRIEF SUMMARY OF THE INVENTION

Flash memory devices and methods for controlling a flash memory device are provided. An embodiment of a flash memory device comprises a memory array and a memory control circuit. The memory array comprises a plurality of memory modules. Each memory module is located in a memory channel and comprises a predetermined number of memory cells. The memory control circuit is coupled to the memory array via an address latch enable (ALE) pin and a command latch enable (CLE) pin. The ALE pin and the CLE pin are coupled to all of the memory cells and shared by all of the memory cells in the memory array.

An embodiment of a method for controlling a flash memory device comprises: coupling an address latch enable (ALE) pin and a command latch enable (CLE) pin to a plurality of memory modules of a memory array, wherein each memory module is located in a memory channel and comprises a predetermined number of memory cells, and wherein the ALE pin and the CLE pin are coupled to and shared by all of the memory cells in the memory array; coupling a read enable (RE) pin and a write enable (WE) pin to each memory channel; coupling a chip enable (CE) pin to one memory cell in each memory channel; activating one CE pin and one RE/WE pin so as to select a corresponding memory cell coupled therebetween; and receiving ALE and CLE information from a host via the ALE pin and the CLE pin so as to control operations the selected memory cell.

Another embodiment of a flash memory device comprises a memory array and a memory control circuit. The memory array comprises a plurality of memory modules. Each memory module is located in a memory channel and comprises a predetermined number of memory cells. The memory control circuit is coupled to the memory array via an address latch enable (ALE) pin and a command latch enable (CLE) pin. The memory control circuit interrupts a current data transmission of a specific memory module when receiving a command transfer request of another memory module, transfers the command to the memory module, and resumes data transmission after the command has been transferred. The ALE pin and the CLE pin are coupled to all of the memory cells and shared by all of the memory cells in the memory array.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein:

Table 1: Description of Data pins and Control pins;

Figure 1:
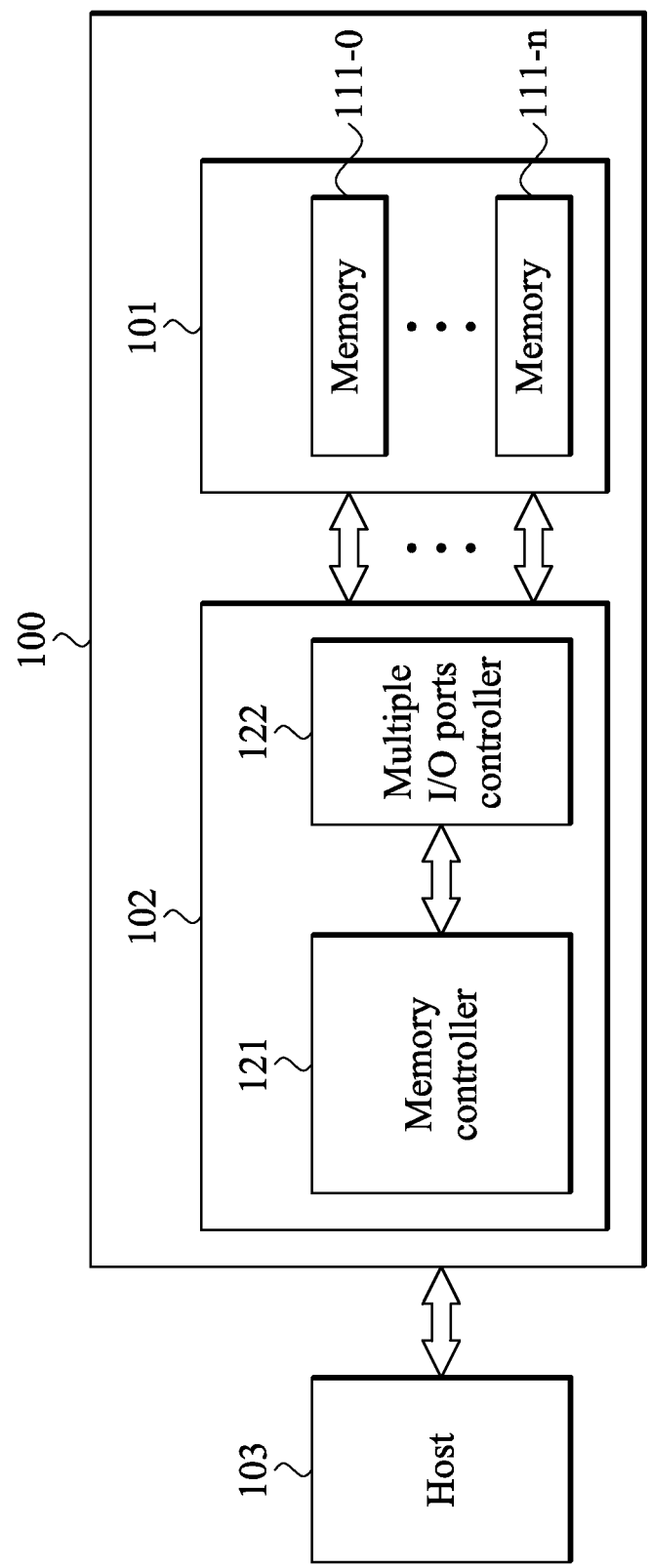
Figure 2:
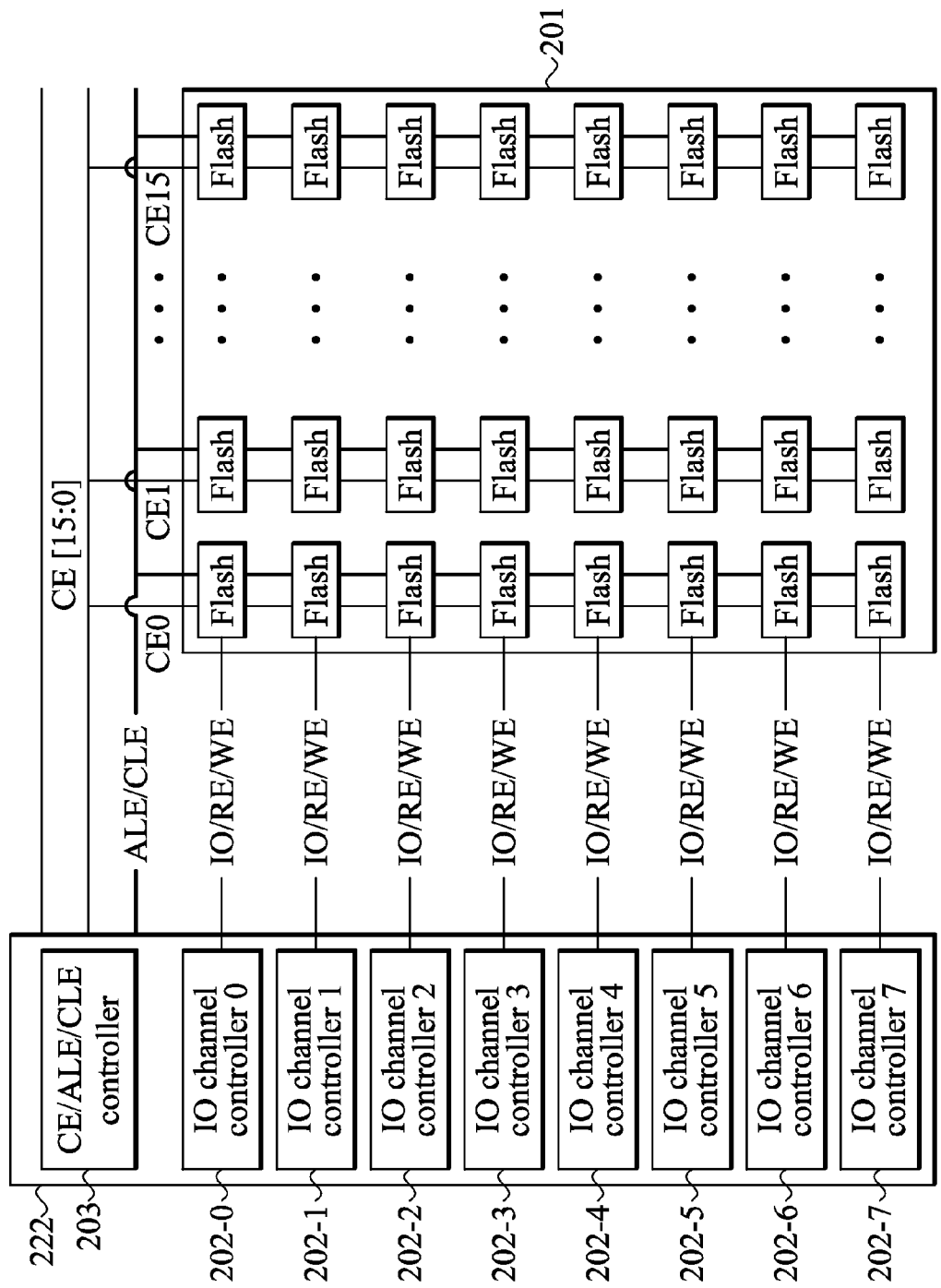
Figure 3A:
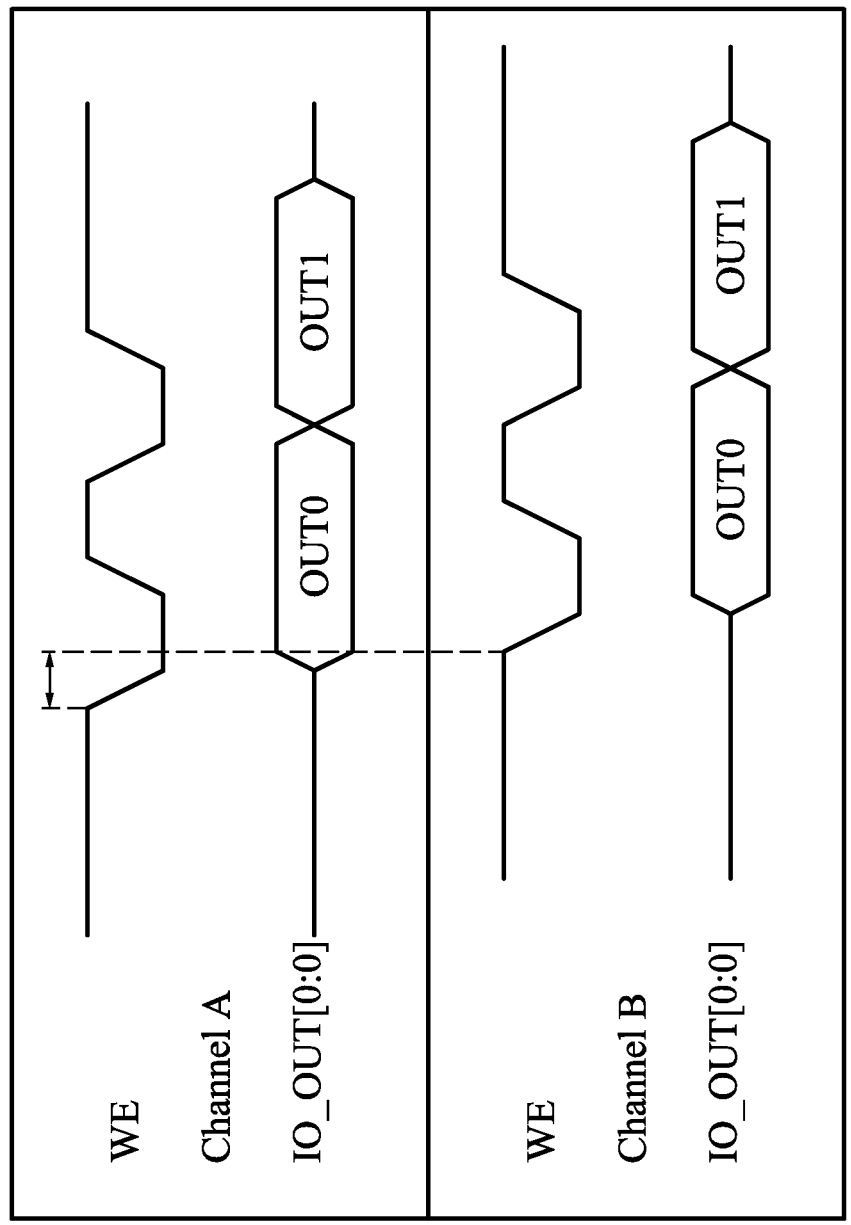
Figure 3B:
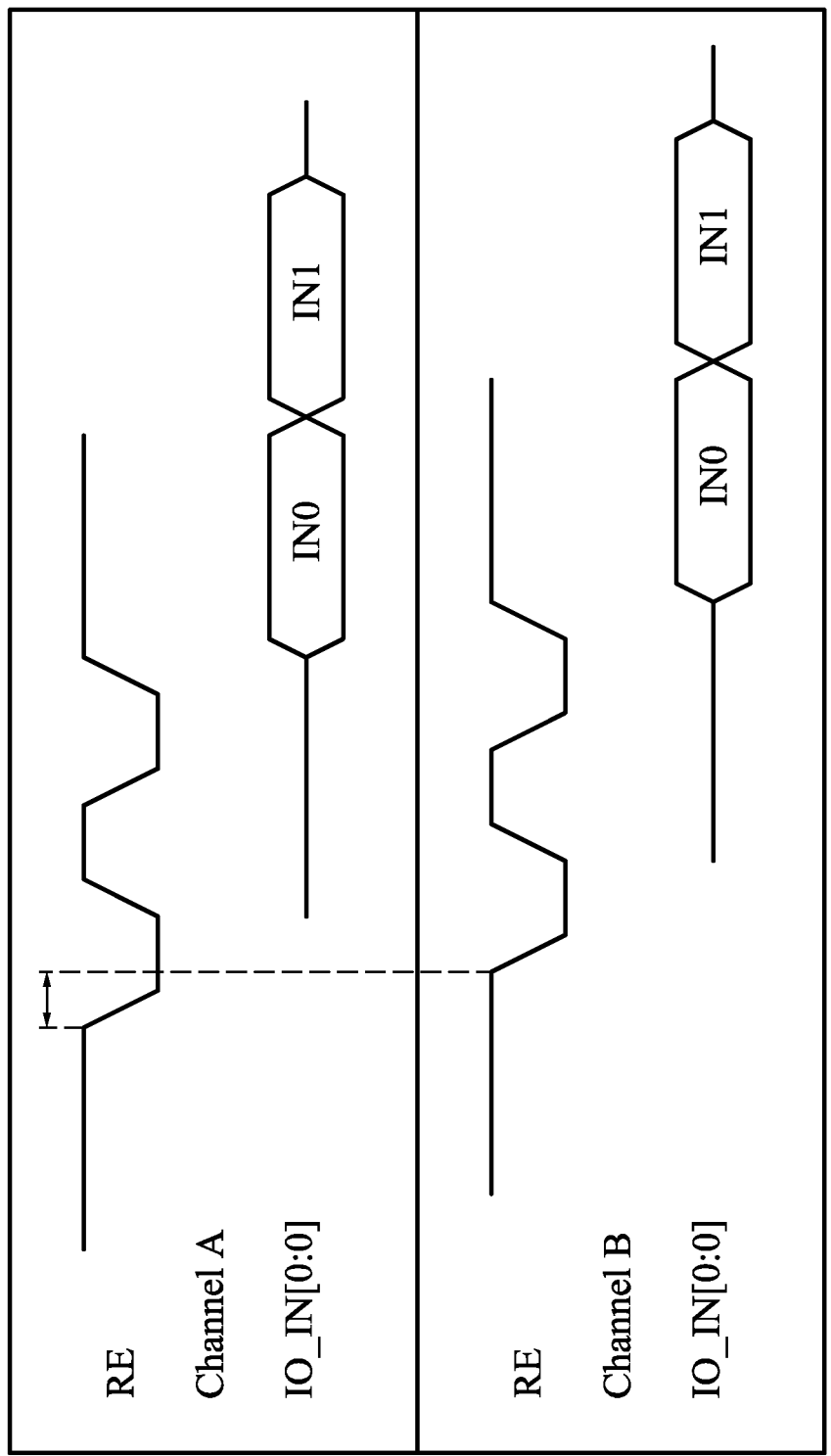
Figure 4:
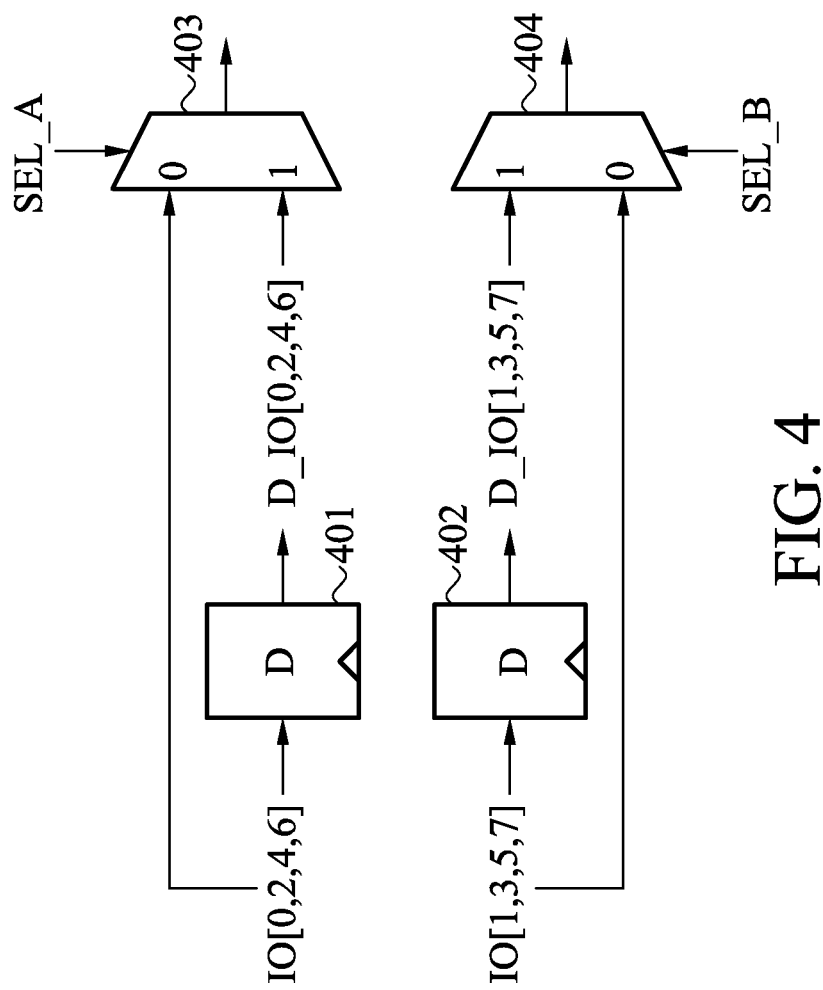
Figure 5:
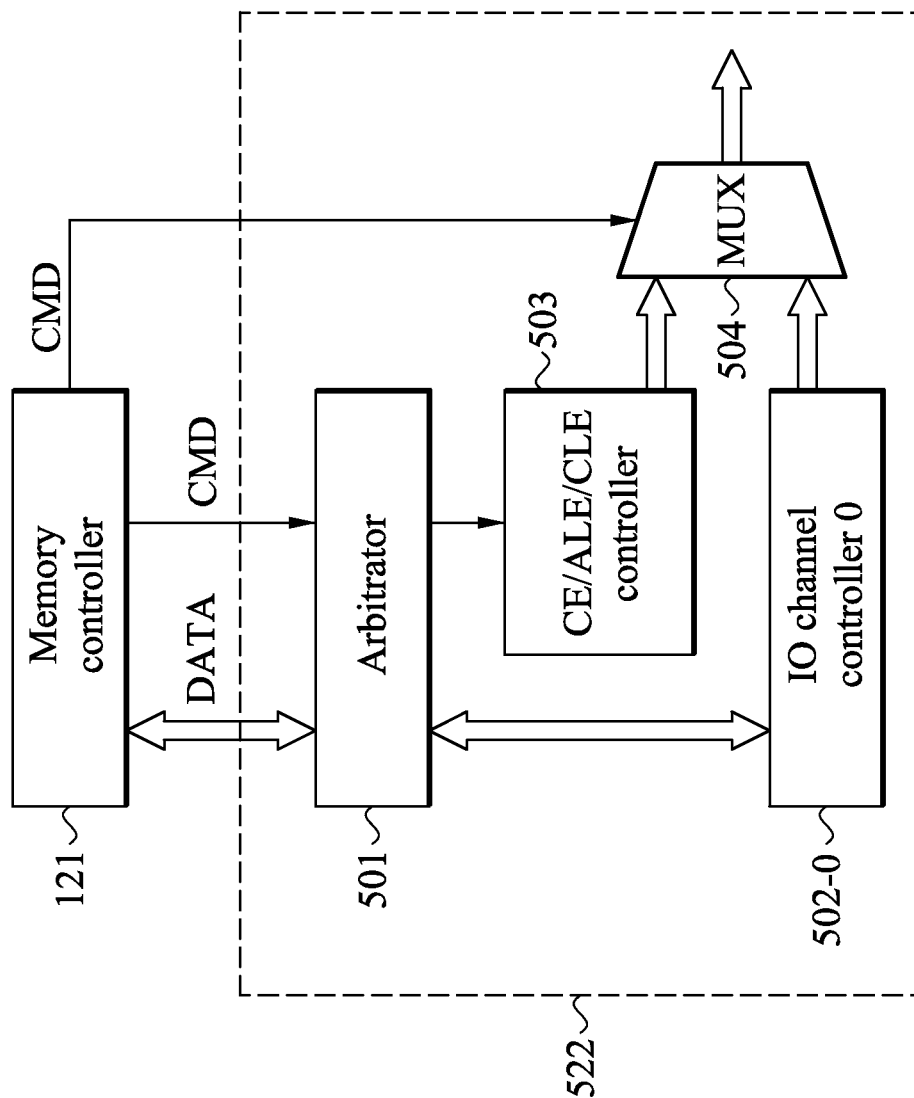
Figure 6:
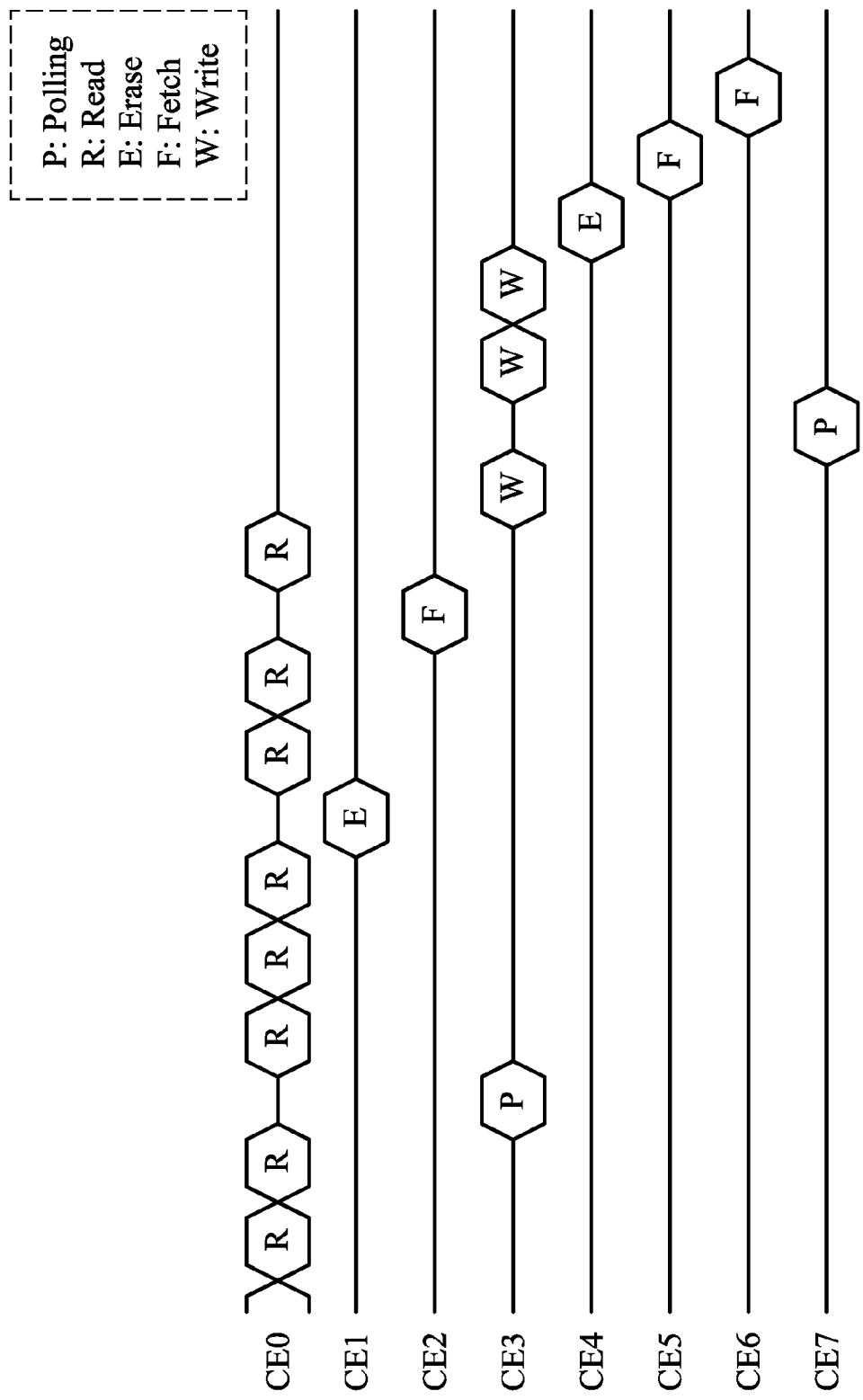
Figure 7:
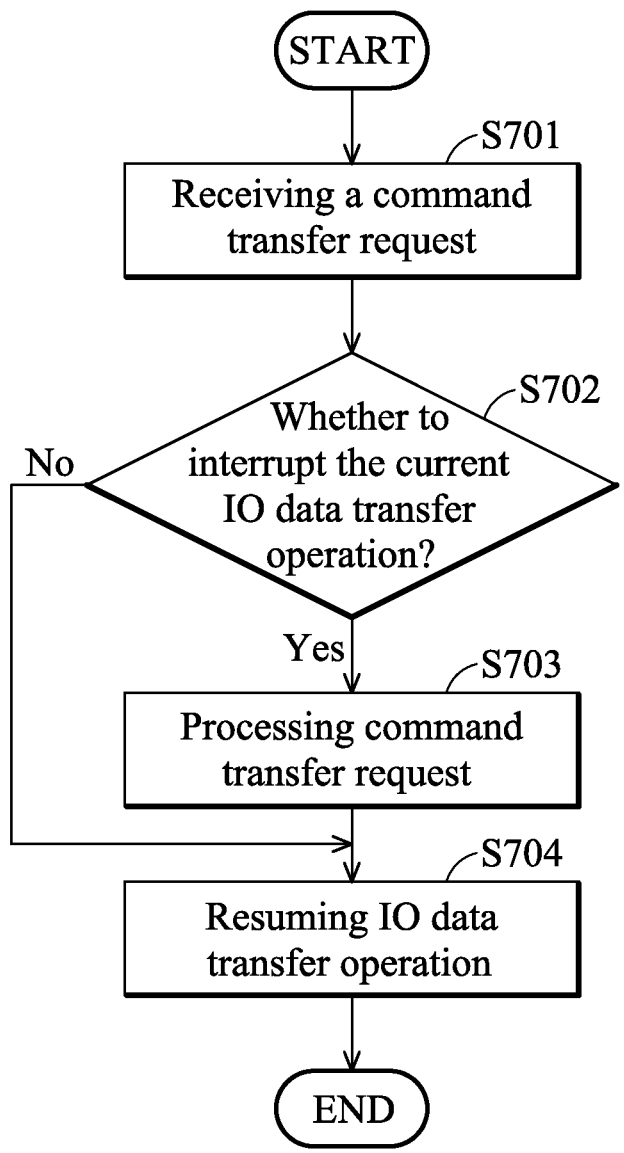
Figure 8:
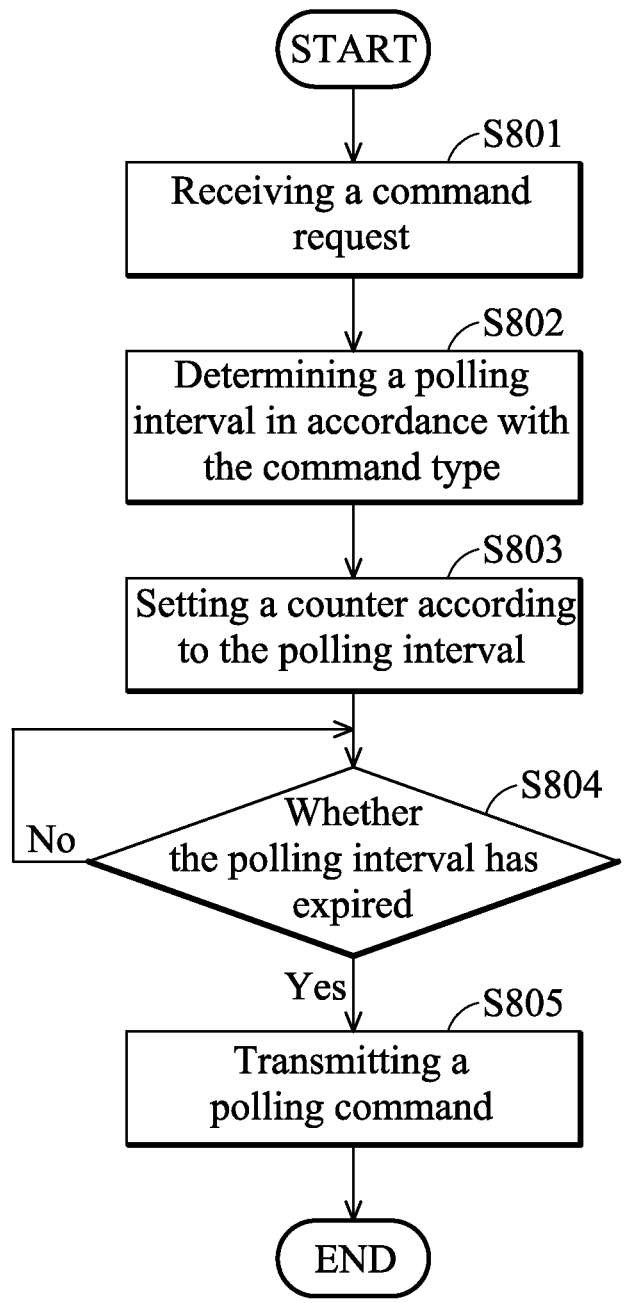
Figure 9:
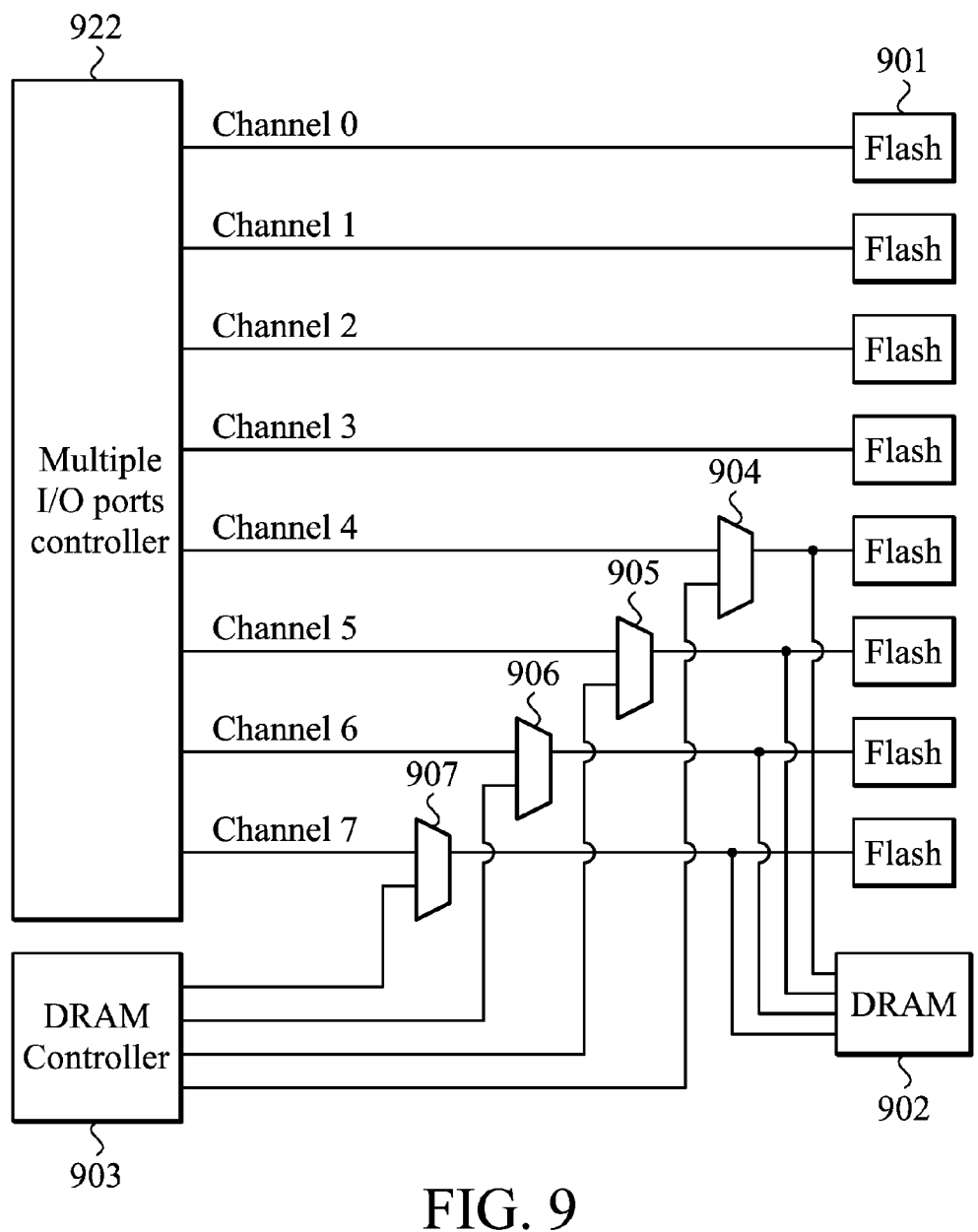

Table 2: Total pin Count for an 8-channel Memory Device;

FIG. 1 shows a flash memory device according to an embodiment of the invention;

FIG. 2 shows an exemplary pin configuration of a flash memory device according to an embodiment of the invention;

FIG. 3A and FIG. 3B show the exemplary interleaved write and read timing between different channels according to an embodiment of the invention;

FIG. 4 shows an exemplary block diagram performing 10 data bit delay according to an embodiment of the invention;

FIG. 5 shows a block diagram of the memory control circuit according to an embodiment of the invention;

FIG. 6 shows an exemplary timing diagram corresponding to the memory operations of each channel according to an embodiment of the invention;

FIG. 7 shows a flow chart of a method for determining whether to interrupt a current I/O data transfer operation according to an embodiment of the invention;

FIG. 8 shows a flow chart of a method for issuing a polling command according to an embodiment of the invention; and FIG. 9 shows an exemplary pin configuration of a flash memory device according to another embodiment of the invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

FIG. 1 shows a flash memory device according to an embodiment of the invention. The flash memory device 100 comprises a memory array 101 and a memory control circuit 102. The memory array 101 comprises a plurality of memory modules 111-0 to 111-n. According to an embodiment of the invention, each memory module may be located in a corresponding memory channel. Generally, a memory channel may be coupled to the memory control circuit 102 via a set of input/output (I/O) data pins and the corresponding I/O data lines. As an example, one memory channel may be coupled to the memory control circuit 102 via 8 data lines, each of which is responsible for carrying one bit of data. Therefore, for an 8-channel memory array (i.e. n=8 in this example), the overall data transmission bandwidth may achieve (8×8=64) bits.

According to an embodiment of the invention, the memory modules 111-0 to 111-n may be implemented by using a Multi-Chip Module (MCM) technique, by which multiple integrated circuits (ICs), semiconductor dies or other modules are packaged in such a way so as to facilitate their use as a single IC. Therefore, in the embodiments of the invention, each memory module may comprise a predetermined number of memory cells (also called chips or flash dies), where the predetermined number may be, as an example, from 2 up to 16, depending on the package technique used.

According to an embodiment of the invention, the memory control circuit 102 may comprise a memory controller 121 and a multiple I/O ports controller 122. The memory controller 121 may comprise a host interface (not shown) serving as an interface between the flash memory device 100 and an external host 103. In this embodiment, a host is defined as a system or subsystem that stores information in the flash memory device 100. The memory controller 121 receives access requests from the host (e.g. read and write operations) and controls the access operations of the memory array 101. The multiple I/O ports controller 122 controls the configuration and operations of the plurality of data pins (e.g. the 8 bits I/O data pins) and control pins coupled between the memory control circuit 102 and the memory array 101. According to an embodiment of the invention, the memory controller 121 and multiple I/O ports controller 122 may also be packaged in a single IC.

Table 1 lists the data pins and control pins utilized in a conventional flash memory device.

TABLE 1

Description of Data pins and Control pins

| PIN Names | Description |
|---|---|
| I/O | I/O ports |
| CE1 | Chip enable (Chip A) |
| CE2 | Chip enable (Chip B) |
| WE | Write Enable |
| RE | Read Enable |
| CLE | Command Latch Enable |
| ALE | Address Latch Enable |
| WP | Write protect |
| RY/BY 1 | Ready/Busy (Chip A) |
| RY/BY 2 | Ready/Busy (Chip B) |

Conventionally, for an 8-channel memory device with each memory module comprising 16 memory cells and supporting 8 bits I/O data transmission, the total pin number including the data pins and control pins is 128 (i.e. 16+112) as derived in Table 2:

TABLE 2

Total pin Count for an 8-channel Memory Device

| number of channel | I/O | Pin number of CE WE/RE/ALE/CLE | RB (i.e. RY/BY) | WP | 16 Sum |
|---|---|---|---|---|---|
| 1 | 8 | 4 | 1 | 1 | 14 |
| 2 | 16 | 8 | 2 | 2 | 28 |
| 4 | 32 | 16 | 4 | 4 | 56 |
| 8 | 64 | 32 | 8 | 8 | 112 |
| Total pins of 8-channel memory device | | | | | 128 |

Note that the power pins are not included in Table 2. It can be seen from Table 2 that the total pin number greatly increases as the channel number increases.

FIG. 2 shows an exemplary pin configuration of a flash memory device according to an embodiment of the invention. As shown in FIG. 2, in the embodiments of invention, the WP (Write Protect) and RB (i.e. RY/BY, Ready/Busy) pins have been removed. Instead of using the RB pin to check the Busy/Ready status of a memory cell and using the WP (write protect) pin to write protect the memory cell, the memory controller may use a polling command to retrieve a current status of the memory cell. In addition, instead of utilizing an ALE (Address Latch Enable) pin and a CLE (Command Latch Enable) pin for each channel in the conventional design, there is only one ALE pin and one CLE pin reserved in the proposed configuration. Specifically, the corresponding ALE and CLE lines of the ALE and CLE pins are coupled to all of the flash memory cells (labeled by flash in FIG. 2) of the memory array 201 and the only one ALE line and only one CLE line are shared between the memory cells. Due to the reduction of 8 WP pins, 8 RB pins, 7 ALE pins and 7 CLE pins for the 8-channel memory device, the overall pin number may be, therefore, greatly reduced to 98 (i.e. 128-16-14). Details of operations based on the pin configuration shown in FIG. 2 will be described in the following paragraphs.

According to an embodiment of the invention, the memory array 201 may be an 8×16 memory array with 8 memory channels each having 16 memory cells. The multiple I/O ports controller 222 may comprise a CE/ALE/CLE controller 203 and 8 IO channel controllers 202-0 to 202-7 for controlling the I/O operations of each memory channel. The chip enable pins CE0 to CE15 respectively controls the 16 memory cells of each memory channel. Only one CE pin is allowed to be active at one time so as to individually enable or disable the specific memory cells coupled to the selected CE pin. When a CE pin is active, all of the memory cells corresponding to the active CE pin in each memory channel may be enabled at the same time.

Furthermore, each IO channel controller uses IO/RE/WE pins to connect to the memory cells in the memory array 201. The IO/RE/WE labeled in FIG. 2 stands for a set of pins including a predetermined number of (as an example, 8) I/O data pins, a read enable (RE) pin and a write enable (WE) pin. The memory cells that belong to the same channel share the same IO/RE/WE pins. For example, there are (8 IO+1 RE+1 WE) pins for each channel and therefore, (8+1+1)×8=80 pins for an 8 channel layout. According to an embodiment of the invention, each channel may be enabled/disabled individually, depending on the polarity of the RE/WE pins. If both the RE and WE pins are in-active, the corresponding channel is disabled, even though the CE pin is active. As previously described, since the ALE and CLE pins may be optimized and connected to all memory cells of the memory array, all memory cells receive the same ALE/CLE information.

According to another embodiment of the invention, the multiple I/O ports controller 122 may further adjust the read/write timing (i.e. read timing or write timing) of all of the memory cells individually so that a rising and/or a falling edge of the read enable (RE) strobe signal or the write enable (WE) strobe signal corresponding to the memory cells does not occur at the same time. The advantage of using different timings is to provide a better timing margin on a PCB board and to compensate timing skew between channels. Typically, the multiple I/O ports controller 122 may adjust the read/write timing in two phases. One phase refers to a CE-based configuration (not shown), which means that the memory cells coupled to a same CE pin share common read/write timing configurations. Another phase refers to a channel-based adjustment (not shown), which means that the read/write timing of the memory cells in different memory channels may further be adjusted based on the CE-based configuration. As an example, the multiple I/O ports controller 122 may adjust the read/write timing of the memory cells in different memory channels by using different delays.

FIG. 3A and FIG. 3B show the exemplary interleaved write and read timing between different channels according to an embodiment of the invention. As shown in FIG. 3A and FIG. 3B, the write and read timing between channel A and channel B are respectively interleaved, so that falling edges of the WE strobe signal between channels of FIG. 3A and falling edges of the RE strobe signal between channels of FIG. 3B may not occur at the same time. Also, the subsequent start of I/O data transmissions are also interleaved among the write and read timing between channel A and channel B. In this way, the timing configuration of every memory cell in the memory array may be adjusted individually according to a PCB layout, and the WE and RE strobe signals of each channel may be designed to have different latency with respect to each other. When 8 memory cell RE pins corresponding to a same CE pin toggle at different timestamps, the output data of all memory cells responding to the RE strobe signal will not be toggled together. The interleaved WE/RE strobe signals significantly reduce power consumption due to the prevention of simultaneously WE/RE toggling.

In addition, according to another embodiment of the invention, each channel may further be designed to have its own bit delay setting as well. As an example, the multiple I/O ports controller may further adjust output timing of the data output from the 10 data pins by using different delays. FIG. 4 shows an exemplary block diagram performing IO data bit delay according to an embodiment of the invention. The 0,2,4,6-th IO data bits and the 1,3,5,7-th IO data bits may be respectively delayed for one or more clock cycles via the corresponding D flip flops 401 and 402. The multiple I/O ports controller generates the control signals SEL_A and SEL_B to respectively control the multiplexers 403 and 404 to output the original IO data bits IO[0,2,4,6] and IO[1,3,5,7] or the delayed 10 data bits D_IO[0,2,4,6] and D_IO[1,3,5,7].

According to another embodiment of the invention, the multiple I/O ports controller may further determine whether to interrupt a current I/O data transfer operation when receiving a command transfer request. Generally, the memory operation may be divided into 2 types: an IO data transfer operation and a command transfer operation. The IO data transfer operation may further be divided into an IO Read operation and an IO Write operation. According to the embodiment of the invention, in order to utilize the memory array more efficiently, the multiple I/O ports controller may further interrupt a current data transmission of a specific memory module when receiving a command transfer request of another memory module, transfer the command to the memory module, and resume data transmission after the command has been transferred.

FIG. 5 shows a block diagram of the memory control circuit according to an embodiment of the invention. In the embodiment of the invention, the multiple I/O ports controller 522 may further comprise an arbitrator 501 receiving IO data transfer requests and command transfer requests from the memory controller 121, arbitrating a priority of the received IO data transfer requests and command transfer requests, and determining whether to interrupt the current IO data transfer operation of a specific memory module when receiving a command transfer request of another memory module. The multiplexer 504 multiplexes the command from the CE/ALE/CLE controller 503 or the I/O data from the IO channel controllers to the memory array based on the control signal CMD. Note that for simplicity, only one IO channel controller 502-0 is shown in FIG. 5 but the invention should not be limited thereto.

FIG. 6 shows an exemplary timing diagram corresponding to the memory operations of each channel according to an embodiment of the invention. As shown in FIG. 6, channel 0 (CE0) performs a read operation. For an IO read operation, after a fetch (F) CMD is issued, the memory cell enters a busy state. After a predefined period of time, the memory cell leaves the busy state and reverts back to an idle state to receive IO read data transfer requests. During the IO read data transfer operation of channel 0, an erase (E) command of channel 1 is issued. Conventionally, the erase command will not be transferred to the corresponding memory cell of channel 1 until the read data transfer operation of channel 0 has finished. However, waiting a long time for the IO data transfer operation may not be efficient. According to the embodiment of the invention, the multiple I/O ports controller may interrupt the current IO data transfer operation of channel 0 when receiving the erase command request 'E' from channel 1, process the erase command transfer of channel 1, and resume the IO data transfer operation after the erase command has been transferred. Since the erase command has been transferred to the memory cell, a corresponding erase operation in channel 1 may proceed while the read IO data transfer operation is proceeding in channel 0. Therefore, memory operations in different channels may be performed simultaneously and the flash memory device may operate more efficiently.

FIG. 7 shows a flow chart of a method for determining whether to interrupt a current I/O data transfer operation according to an embodiment of the invention. Assuming that the multiple I/O ports controller is currently processing an IO data transfer operation corresponding to a read or write operation for a specific channel. When the multiple I/O ports controller receives a command transfer request (Step S701), as an example, a polling command transfer request, the arbitrator determines whether to interrupt the current IO data transfer operation according to a predetermined rule (Step S702). As an example, when the arbitrator determines that the command transfer request is transferring the command to another channel, the multiple I/O ports controller may interrupt the current IO data transfer operation and process the command transfer request (Step S703). After finishing the command transfer request, the multiple I/O ports controller resumes the IO data transfer operation (Step S704). However, when the arbitrator determines that the command transfer request is not transferring the command to another channel, the multiple I/O ports controller handles the process from Step S702 to Step S704 directly.

As previously described, the memory controller may transmit a polling command to retrieve a busy/ready status of a corresponding memory cell. However, the duration of the busy state may be different based on the issued command type. For example, the busy period of an Erase and a Fetch operation is different according to a flash datasheet. Therefore, according to another embodiment of the invention, a predefined timing parameter called a "Polling interval" is introduced so as to make the polling process more efficient. The memory controller may determine the polling interval in accordance with an access operation of the corresponding memory cell and transmit the polling command to retrieve the busy/ready status of the corresponding memory cell after the polling interval. In the embodiments of the invention, the polling interval may be set to different values in accordance with different command types. With implementation of the polling interval, unnecessary polling commands are avoided and thus the bus bandwidth is optimized.

FIG. 8 shows a flow chart of a method for issuing a polling command according to an embodiment of the invention. After receiving a command request (Step S801), the memory controller determines a polling interval in accordance with the command type (Step S802). As an example, the polling interval for a program, a read, a fetch or an erase command may be different. Next, the memory controller sets a counter according to the polling interval (Step S803) and checks whether the polling interval has expired (Step S804). When the polling interval has expired, the memory controller transmits a polling command to the multiple I/O ports controller (Step S805). According to an embodiment of the invention, the polling command is further passed from the multiple I/O ports controller to the corresponding memory cell to retrieve a busy/ready status of that memory cell. The memory cell may response its status in response to the polling command.

According to yet another embodiment of the invention, since each channel is able to be controlled independently, a portion of the channels may be released and connected to another External Memory device, such as DRAM. The external Memory device will act as an extra buffer to store temporary data rather than directly write data to flash memory devices. FIG. 9 shows an exemplary pin configuration of a flash memory device according to another embodiment of the invention. As shown in FIG. 9, in addition to the flash memory cells 901 of the flash memory array, the flash memory device may further comprise a dynamic random access memory (DRAM) device 902 and a DRAM controller 903. The DRAM device 902 is coupled to a portion of the data pins and control pins of the multiple I/O ports controller 922 in the memory control circuit and sharing the data pins and control pins with a portion of the memory modules. As shown in FIG. 9, the data pins and control pins from channel 4 to channel 7 are shared between the corresponding flash memory cells and the DRAM device 902. The DRAM controller 903 is also coupled to the portion of the data pins and control pins to control the access operations thereof. To selectively switch between the DRAM device 902 or the flash memory modules, a plurality of multiplexers 904 to 907 are coupled to the DRAM controller 903, the multiple I/O ports controller 922 of the memory control circuit and the portion of the data pins and control pins so as to multiplex data and control signals from the DRAM controller and the memory controller to the corresponding data pins and control pins. Based on this structure, the flash memory device may operate more flexibly and efficiently.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A flash memory device, comprising:
    a memory array, comprising a plurality of memory modules, wherein each memory module is located in a memory channel and comprises a predetermined number of memory cells; and
    a memory control circuit, coupled to the memory array via an address latch enable (ALE) pin and a command latch enable (CLE) pin,
    wherein the ALE pin and the CLE pin are coupled to all of the memory cells and shared by all of the memory cells in the memory array, and
    wherein the memory control circuit comprises:
        a memory controller, receiving access requests from a host and controlling access operations of the memory array, wherein the memory controller further determines a polling interval in accordance with an access operation of a corresponding memory cell, sets a counter according to the polling interval for checking whether the polling interval has expired, and transmits a polling command to retrieve a busy/ready status of the corresponding memory cell when the polling interval has expired.

2. The flash memory device as claimed in claim 1, wherein the memory control circuit further adjusts a read timing of all of the memory cells individually so that a rising and/or a falling edge of a read enable (RE) strobe signal of different memory channels does not occur at the same time.

3. The flash memory device as claimed in claim 1, wherein the memory control circuit further adjusts a write timing of all of the memory cells individually so that a rising and/or a falling edge of a write enable (WE) strobe signal of different memory channels does not occur at the same time.

4. The flash memory device as claimed in claim 1, wherein the memory control circuit further comprises:
    a multiple I/O ports controller, controlling configuration and operations of a plurality of data pins and control pins coupled between the memory control circuit and the memory array.

5. The flash memory device as claimed in claim 4, wherein the multiple I/O ports controller is coupled to each memory channel via a read enable (RE) pin, a write enable (WE) pin and a plurality of IO data pins.

6. The flash memory device as claimed in claim 4, wherein the multiple I/O ports controller is coupled to the memory array via the predetermined number of chip enable (CE) pins, and wherein each CE pin is coupled to one memory cell of each memory module.

7. The flash memory device as claimed in claim 6, wherein the multiple I/O ports controller adjusts a read/write timing of all of the memory cells individually by adjusting the read/write timing of the memory cells coupled to a same CE pin using a common configuration, and adjusting the read/write timing of the memory cells in different memory channels by using different delays.

8. The flash memory device as claimed in claim 5, wherein the multiple I/O ports controller further adjusts output timing of the data output from the IO data pins by using different delays.

9. The flash memory device as claimed in claim 4, wherein the multiple I/O ports controller further interrupts a current data transmission of a specific memory module when receiving a command transfer request of another memory module, transfers the command to the memory module, and resumes data transmission after the command has been transferred.

10. The flash memory device as claimed in claim 4, further comprising:
   a dynamic random access memory (DRAM) device, coupled to a portion of the data pins and control pins of the memory control circuit and sharing the data pins and control pins with a portion of the memory modules;
   a DRAM controller coupled to the portion of the data pins and control pins; and
   a plurality of multiplexers, coupled to the DRAM controller, the memory control circuit and the portion of the data pins and control pins, and multiplexing data and a plurality of control signals from the DRAM controller and the memory controller to the corresponding data pins and control pins.

11. A method for controlling a flash memory device, comprising:
   coupling an address latch enable (ALE) pin and a command latch enable (CLE) pin to a plurality of memory modules of a memory array, wherein each memory module is located in a memory channel and comprises a predetermined number of memory cells, and wherein the ALE pin and the CLE pin are coupled to and shared by all of the memory cells in the memory array,
   coupling a read enable (RE) pin and a write enable (WE) pin to each memory channel;
   coupling a chip enable (CE) pin to one memory cell in each memory channel;
   activating one CE pin and one RE/WE pin so as to select a corresponding memory cell coupled therebetween;
   receiving ALE and CLE information from a host via the ALE pin and the CLE pin so as to control the corresponding memory cell;
   determining a polling interval in accordance with an access operation of the corresponding memory cell;
   setting a counter according to the polling interval for checking whether the polling interval has expired; and
   transmitting a polling command to retrieve a busy/ready status of the corresponding memory cell when the polling interval has expired.

12. The method as claimed in claim 11, further comprising:
   adjusting a read/write timing of all of the memory cells individually so that a rising and/or a falling edge of a read enable (RE) strobe signal or a write enable (WE) strobe signal corresponding to different memory cells does not occur at the same time.

13. The method as claimed in claim 11, wherein the adjusting step further comprising:
   adjusting the read/write timing of the memory cells coupled to a same CE pin using a common configuration; and
   adjusting the read/write timing of the memory cells in different memory channels by using different delays.

14. The method as claimed in claim 11, further comprising:
   transmitting data to or receiving data from a specific memory module;
   receiving a command transfer request of another memory module;
   interrupting the current data transmission of the specific memory module;
   transferring the command to the memory module; and
   resuming the data transmission after the command has been transferred.

15. A flash memory device, comprising:
   a memory array, comprising a plurality of memory modules, wherein each memory module is located in a memory channel and comprises a predetermined number of memory cells; and
   a memory control circuit, coupled to the memory array via an address latch enable (ALE) pin and a command latch enable (CLE) pin, interrupting a current data transmission of a specific memory module when receiving a command transfer request of another memory module, transferring the command to the memory module, and resuming data transmission after the command has been transferred;
   wherein the ALE pin and the CLE pin are coupled to all of the memory cells and shared by all of the memory cells in the memory array, and
   wherein the memory control circuit comprises a memory controller receiving access requests from a host and controlling access operations of the memory array, wherein the memory controller further determines a polling interval in accordance with an access operation of a corresponding memory cell, sets a counter according to the polling interval for checking whether the polling interval has expired, and transmits a polling command to retrieve a busy/ready status of the corresponding memory cell when the Dolling interval has expired.

16. The flash memory device as claimed in claim 15, wherein the memory control circuit further comprises:
   a multiple I/O ports controller, controlling configuration and operations of a plurality of data pins and control pins coupled between the memory control circuit and the memory array.

17. The flash memory device as claimed in claim 16, wherein the multiple I/O ports controller further adjusts a read/write timing of all of the memory cells individually so that a rising and/or a falling edge of a read enable (RE) strobe signal or a write enable (WE) strobe signal corresponding to different memory cells does not occur at the same time.

18. The flash memory device as claimed in claim 16, wherein the multiple I/O ports controller is coupled to each memory channel via a read enable (RE) pin, a write enable (WE) pin and a plurality of IO data pins.

19. The flash memory device as claimed in claim 16, wherein the multiple I/O ports controller is coupled to the memory array via the predetermined number of chip enable (CE) pins, and wherein each CE pin is coupled to one memory cell of each memory module.

20. The flash memory device as claimed in claim 19, wherein the multiple I/O ports controller adjusts a read/write timing of all of the memory cells individually by adjusting the read/write timing of the memory cells coupled to a same CE pin using a common configuration, and adjusting the read/write timing of the memory cells in different memory channels by using different delays.

21. The flash memory device as claimed in claim 18, wherein the multiple I/O ports controller further adjusts output timing of the data output from the IO data pins by using different delays.

22. The flash memory device as claimed in claim 15, further comprising:
   a dynamic random access memory (DRAM) device, coupled to a portion of the data pins and control pins of the memory control circuit and sharing the data pins and control pins with a portion of the memory modules;
   a DRAM controller coupled to the portion of the data pins and control pins; and a plurality of multiplexers, coupled to the DRAM controller, the memory control circuit and the portion of the data pins and control pins, and multiplexing data and a plurality of control signals from the DRAM controller and the memory controller to the corresponding data pins and control pins.

\* \* \* \* \*